United States Patent
Specht

[11] Patent Number: 5,906,326
[45] Date of Patent: May 25, 1999

[54] BELT PRETENSIONER FOR A SAFETY BELT

[75] Inventor: Martin Specht, Feldafing, Germany

[73] Assignee: HS Technik und Design Technische Entwicklungen GmbH, Wessling, Germany

[21] Appl. No.: 09/011,268
[22] PCT Filed: May 28, 1997
[86] PCT No.: PCT/EP97/02790
§ 371 Date: May 12, 1998
§ 102(e) Date: May 12, 1998
[87] PCT Pub. No.: WO97/45299
PCT Pub. Date: Dec. 4, 1997

[30] Foreign Application Priority Data

May 30, 1996 [DE] Germany .......................... 196 21 772

[51] Int. Cl.⁶ .............................................. B60R 22/46
[52] U.S. Cl. .............................................. 242/374
[58] Field of Search ........................... 242/374; 280/806; 297/478, 480

[56] References Cited

U.S. PATENT DOCUMENTS 5,681,004 10/1997 Specht ..................................... 242/374

FOREIGN PATENT DOCUMENTS 629531 12/1994 European Pat. Off. .
4429731 2/1996 Germany .

Primary Examiner—John M. Jillions
Attorney, Agent, or Firm—Evenson, McKeown, Edwards & Lenahan, PLLC

[57] ABSTRACT

The invention relates to a belt tightening device for a seat belt having at least two pyrotechnically drivable drive units 10, 11 which can be moved in guides 14, 32 in a housing 1 and which, in a chronologically adapted succession, can be brought into a driving engagement with a winding shaft of a seat belt retractor and cause this shaft to carry out a rotating movement which tightens the belt. Furthermore a sun gear 2 is provided which can be rotationally coupled with the winding shaft, as well as a planet gear 7 which is guided on a circular-segment-shaped moving path around the sun gear 2, this planet gear 7 moving along a housing-fixed toothing 9 and simultaneously being in a rotation-transmitting engagement with an external toothing of the sun gear 2, and each drive unit 10, 11 for transmitting its driving movement onto the planet gear 7, being coupled with this planet gear 7 for a defined movement section of the planet gear 7. The belt tightening device may have a crank or crank disk 4 which is disposed to be rotatable concentrically with respect to the axis of the sun gear 2 and on which the planet gear 7 is disposed in a rotatable manner and which, for transmitting the movement, has at least one engagement point 25 for the engagement of the drive units 10, 11.

17 Claims, 5 Drawing Sheets

BELT PRETENSIONER FOR A SAFETY BELT

The invention relates to a belt tightening device for a seat belt retractor.

In the normal driving operation of a motor vehicle, the seat belt rests relatively loosely against the vehicle occupant's body. In the event of an accident, there will then be the danger that, despite the blocking of the winding shaft of the seat belt retractor, the vehicle occupant's body can move too far toward the front. Also, the belt strap layers are wound relatively loosely onto the winding shaft of the belt retractor so that, despite the blocking of the winding shaft, this looseness of the belt may result in a considerable displacement of the vehicle occupant to the front because of a film spool effect.

From European Patent Document EP 0 629 531 A1, an arrangement is known for a pyrotechnic rotational drive of a winding shaft of a seat belt retractor which has two piston-shaped driving bodies which can be moved by the driving force of pyrotechnic propellent charges on straight or curved guideways. The driving bodies have toothed-rack-type toothings which can be engaged with a winding shaft gear wheel so that they mesh with these and in the process translate their longitudinal movement into a rotation of the winding shaft gear wheel. The ignition of the propellent charge of the second driving body can be triggered in a manner which is controlled such that the two driving bodies drive the winding shaft gear wheel in a chronological succession.

From German Patent Document DE 44 29 731 A1, a transmission is known for transmitting the driving movement of a belt tightening drive to a belt spool of a seat belt retractor. The transmission is constructed as an epicycloidal gear system and particularly as a planetary gear system with a stationarily arranged ring gear and at least one planet gear which is affected by the belt tightening drive, and having a sun gear which is connected with the belt spool in a connectable or non-rotatable manner. The planet gear is driven by means of a belt tightening drive which is constructed as a gas generator and, by way of a propellant gas duct, drives a piston which is connected with the planetary gear shaft by way of a connecting rod. The ring gear, the sun gear and the planet gear have external toothings which engage with one another. When the gas generator is ignited, the planet gear rolls on the stationary ring gear as the result of the generated thrust motion. The sun gear is rotated simultaneously. When two planet gears are used, these are connected with one another by means of a connecting rod in order to carry out a joint thrust movement when ignited simultaneously. However, the planetary gear system requires considerable installation space which makes a compact arrangement on a seat belt retractor difficult.

In contrast, it is object of the present invention to improve the arrangement with respect to a compact construction and to its operability.

Whereas, in the case of the first-mentioned state of the art, the speed and the length of the driving body, which is moved tangentially along the winding shaft gear wheel, determine the rotational speed and the angle of rotation of the winding shaft, in the case of the belt tightening device according to the invention, only a planet gear is guided in the housing on a moving path which is as short and as space-saving as possible, in which case it causes the central sun gear to rotate. By a suitable selection of the ratio of the size of the planet gear to that of the sun gear, the required belt tightening path and the winding shaft rotation required for this purpose can be achieved without an additional transmission between the sun gear and the winding shaft. Because of the two successively ignited drive units, the driving power will be generated longer and will be distributed along the movement path with acceleration courses which can be set by the ignition characteristics. The sun gear may be connectable with the winding shaft by way of a clutch, as described, for example, in German Patent Document, DE 43 27 134 A1 or DE 44 18 438 A1.

The introduction of power and movement into the planet gear expediently takes place by a crank, a crank disk or a comparable element which is disposed concentrically to the sun gear in a housing or rotatably on a pivot of the sun gear. This crank or crank disk extends radially beyond the sun gear and, on this section, provides a bearing for the planet gear so that this planet gear can roll on the toothing at the housing and thereby can cause the sun gear to rotate. On a second lever arm of the crank disk, at least one engaging point is provided on which the two drive units are successively or chronologically temporarily overlapping in a movement and power or torque transmitting engagement.

An embodiment of the invention is particularly advantageous according to which the first drive unit triggers after a certain movement path an igniter for a propellent charge of the second drive unit. This ensures an operationally reliable and precisely timed ignition because only the moving action of the first drive unit is determining for the ignition action so that no further control parts are required which are susceptible to defects. The triggering may be based on various physical principles, in which case a mechanical triggering is expediently used in the case of which a part of the drive unit acts directly or by way of an intermediate element on an igniter, or a pressure triggering is used in the case of which the gas pressure of the first propellent charge in the expansion space causes the ignition.

The piston may be provided with a sealing element. As a result, it is achieved that if the piston is, for example, fitted into the guide with a wider fit, this is, with a larger play, or if the one-piece piston connecting rod unit can carry out a pendulum motion, the piston is nevertheless sufficiently sealed off toward the propellent gas space. Such a sealing element is preferably a plastic sealing element constructed according to German Registered Utility Model DE 295 14 068.2 U1.

The guides may be arranged in the plane of the sun gear corresponding to the space conditions on the housing. In addition to the two drive units, at least one additional drive unit can be provided, for example, in a second plane which can act upon the crank disk in the same manner and which can be ignited in a time-synchronized succession with respect to the first drive units.

In the following, the invention will be explained in detail by means of embodiments with reference to drawings.

Figure 1:
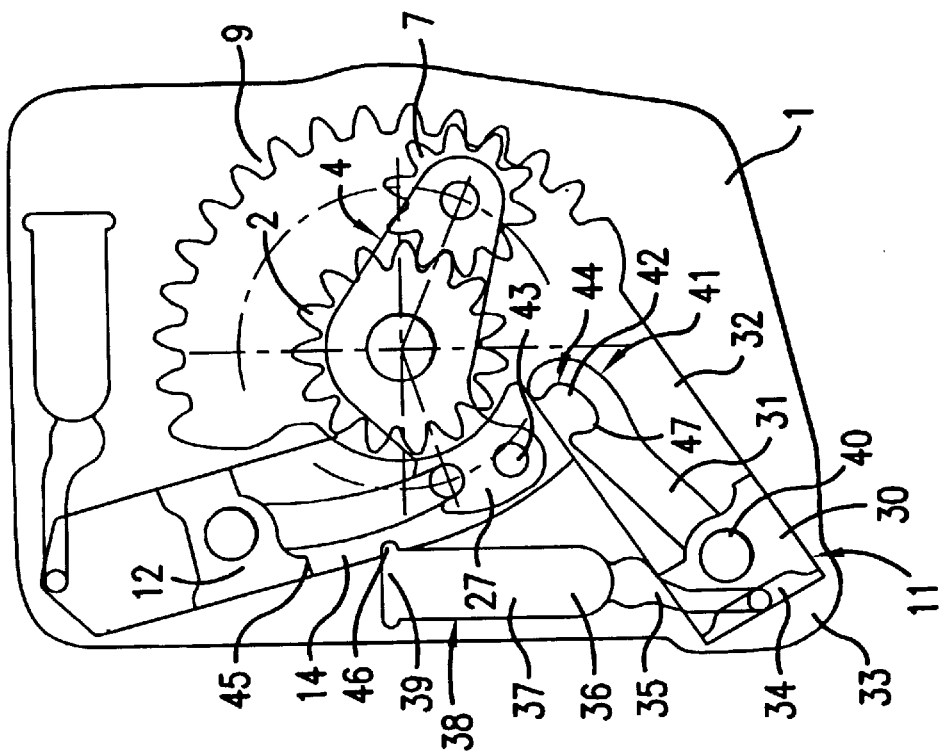
FIG. 1 is a schematic top view of a belt tightening device according to the invention in the initial position.

An embodiment of a belt tightening device (see FIG. 1) contains a housing 1 which is part of a seat belt retractor (not shown) or is mounted laterally on it. The figures show the belt tightening device in a cut-open view, as, for example, in a junction plane of a two housing halves or a support plane of a covering. A central gear wheel or sun gear 2 is rotatably disposed in the housing 1 coaxially with respect to a winding shaft of the seat belt retractor and can be rotationally coupled with the winding shaft by way of a known clutch. A crank or crank disk 4 is rotatably disposed on a pivot 3 of the sun gear 2. In a bearing section 5 of the crank disk 4 which projects radially beyond the sun gear 2, a bore is provided in which a pivot 6 of a planet gear wheel or planet gear 7 is rotatably received so that the planet gear 7 is rotatably disposed in the plane of the sun gear 2 in a meshing with the sun gear 2. An internal toothing 9 which is arranged in a circular-arc-shaped manner and points to the sun gear 2 is also arranged in the housing 1 concentrically with respect to the center axis 8 of the sun gear 2. The radial distance of the internal toothing 9 from the center axis 8 is selected such that, during a rotating movement of the crank disk 4 counterclockwise, the planet gear 7, while rotating itself, runs along the internal toothing 9 and, on the other hand, in the process, by means of a meshing with the sun gear 2, rotationally drives this sun gear 2 counterclockwise.

A primary drive unit 10 and a secondary drive unit 11 are also arranged in the housing 1. A piston connecting rod unit of the primary drive unit 10 having a piston 12 and a connecting rod 13 is received such in a longitudinal guide 14, which extends from a corner area 15 of the housing 1 diagonally inward, that the piston 12 is arranged in the corner area 15 and bounds an expansion space 16 at the end of the longitudinal guide 14 into which a flow duct 17 leads from the direction of a hollow chamber 18 in which a propellent charge 19 of a primary gas generator 20 of the primary drive unit 10 is arranged. The hollow chamber 18 is constructed between the internal toothing and the exterior side 21 of the housing 1 in the housing 1.

The connecting rod 13 of the piston connecting rod unit 12, 13 is swivellably disposed on the piston 12 by means of a journal 22. On its free end 23 situated opposite the piston 12, the connecting rod 13 contains a pivot journal 24 which, in a primary engaging point 25 in the form of an indentation or recess 26 adapted to the pivot journal 24, rests against an engaging section 27 of the crank disk 4. The recess 26 opens essentially in the circumferential direction toward the piston connecting rod unit 12, 13 so that a movement of the piston 12 and of the connecting rod 13 is translated by way of the pivot journal 24 into a counterclockwise rotational movement of the crank disk. In this case, the pivot journal 24 moves on a circular arc, while the connecting rod 13 is simultaneously swivelled with respect to the piston 12 in a pendulum motion. The pivot journal 24 is offset in its position on the recess 26 by an angle of, for example, approximately 150° with respect to the pivot 6 of the planet gear wheel 7.

In the initial or ready position of the belt tightening device illustrated in FIG. 1, the ignition of the primary gas generator 20 after the triggering of a sensor (not shown) takes place in an electrical or mechanical manner. This is known from the state of the art and is therefore not described in detail. The generated propellant gas flows by way of the flow duct 17 into the expansion space 16 and advances the piston 12 in the longitudinal guide 14 (see FIG. 2). In this case, the connecting rod 13 causes the crank disk 4 to rotate which, in turn, moves the planet gear 7 on a circular path around the sun gear 2. The planet gear 7, which rolls off on the internal toothing 9, in this case, causes the sun gear 2 to rotate which, in turn, is transmitted to the winding shaft for tightening the seat belt. When the rotation of the sun gear 2 starts, this sun gear is coupled with the winding shaft of the seat belt retractor. In the position illustrated in FIG. 2, the crank disk 4 is swivelled about an angle of 37.5°.

The secondary drive unit 11 (see particularly FIG. 2) has a piston connecting rod unit 30, 31 which has a piston 30 and a connecting rod 31 and which is received in a longitudinal guide 32, which extends from an adjacent corner area 33 (FIG. 2, left bottom) of the housing 1 diagonally innards approximately in the direction of the planet gear 7, such that the piston 30 is arranged in the corner area 33 and bounds an expansion space 34 into which a flow duct 35 leads from the direction of a hollow chamber 36 in which a propellent charge 37 of a secondary gas generator 38 is arranged. The hollow chamber 36 formed in the housing 1, by means of its one end area 39, adjoins the longitudinal guide 14 of the primary drive unit 10 and extends approximately in the direction of the piston 30 of the piston connecting rod unit 30, 31.

The connecting rod 31 of the piston connecting rod unit 30, 31 is swivellably disposed on the piston 30 by means of a pivot 40. On the free end 41 of the connecting rod situated opposite the piston 30, a secondary engagement point is formed in the form of an oblong-hole-type recess 42 which opens on the longitudinal side of the connecting rod 31 toward the connecting rod 13 of the primary drive unit 10 and is adapted for receiving a pin 43 which is mounted on the engagement section 27 of the crank disk 4 in a parallel alignment with respect to the center axis 8 at an angular distance of approximately 20° to 30° offset from the primary engagement point 25.

Figure 2:
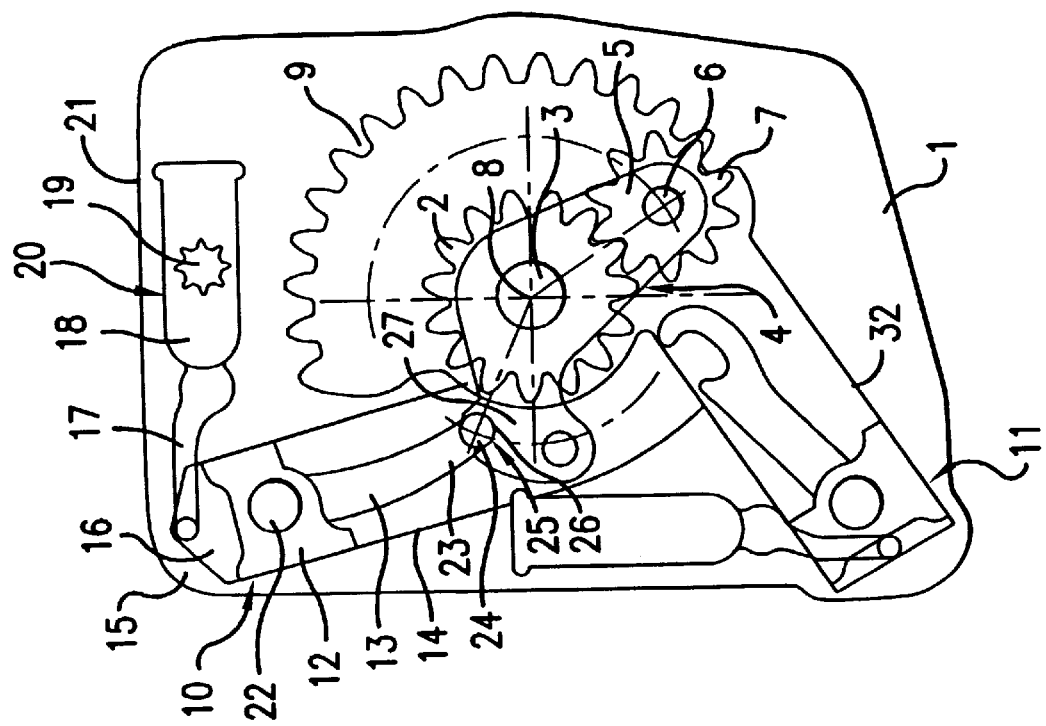
FIG. 2 is a top view according to FIG. 1 of the belt tightening device in a first movement phase on the basis of the driving by means of a primary drive unit.

In the position of the belt tightening device illustrated in FIG. 2, the piston 12 and the connecting rod 13 are still in a movement driving the crank disk 4. The connecting rod 31 is swivelled into a receiving position against the approaching pin 43 and is prestressed into this position, for example, by means of a spring which is supported on the pivot 40 with respect to the piston 30.

Figure 3:
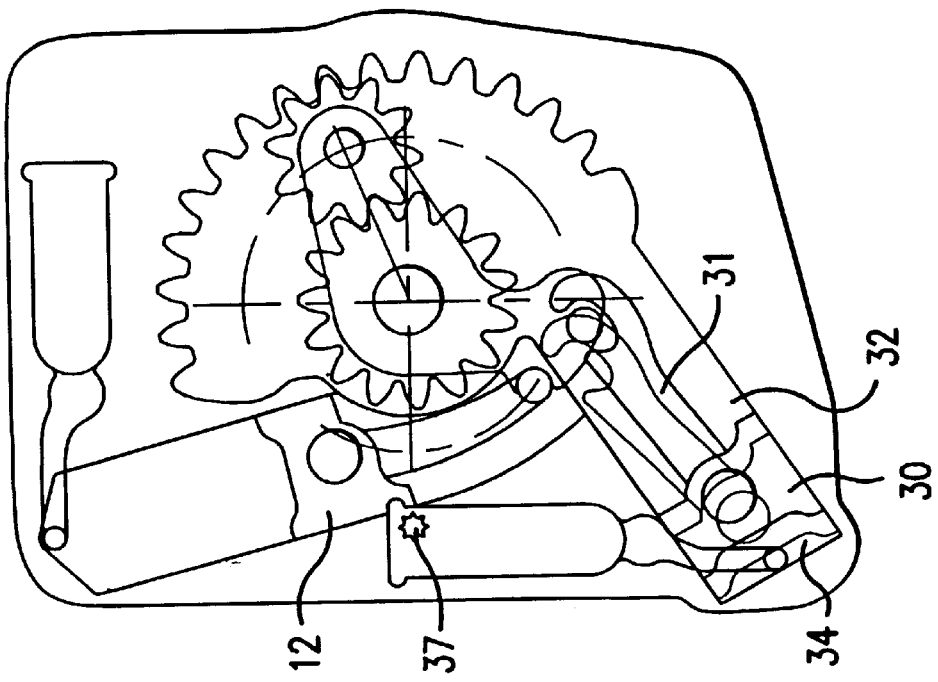
FIG. 3 is a top view according to FIG. 1 of the belt tightening device in a second movement phase.

In the case of a further movement sequence (see FIG. 2 and FIG. 3), the piston connecting rod unit 12, 13 continues to rotate the crank disk 4, in which case the pin 43 engages in the oblong-hole-type recess 42 and is placed on a forward surface adapted to the pin 43 and in the process swivels the connecting rod 31 into the position illustrated in FIG. 3 (which shows a rotation of the crank disk 4 about an angle of 75°), in which case the piston 30 is also moved forward by a short distance in the longitudinal guide 32.

Figure 4:
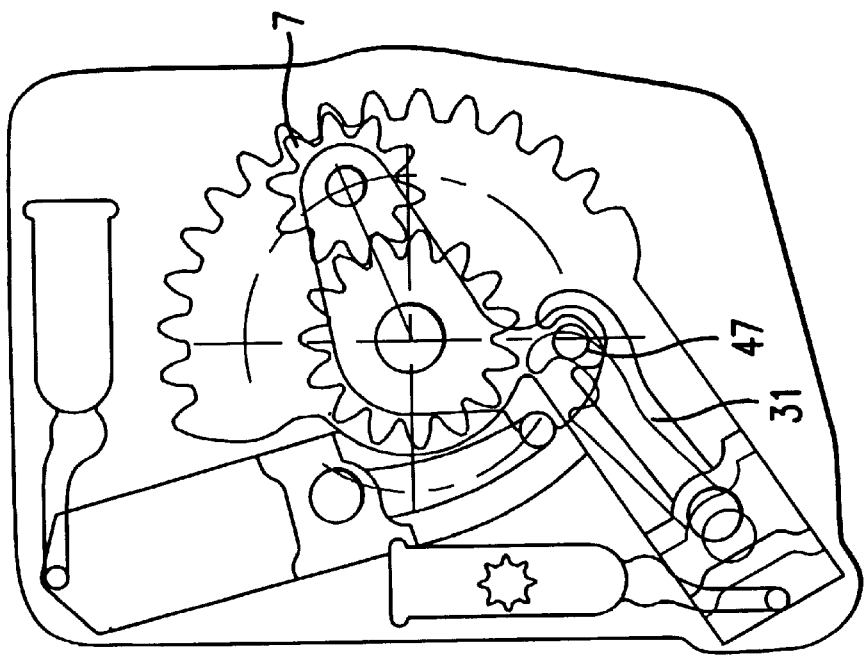
FIG. 4 is a top view according to FIG. 1 of the belt tightening device in a third movement phase when driven by a secondary drive unit.
Figure 6:
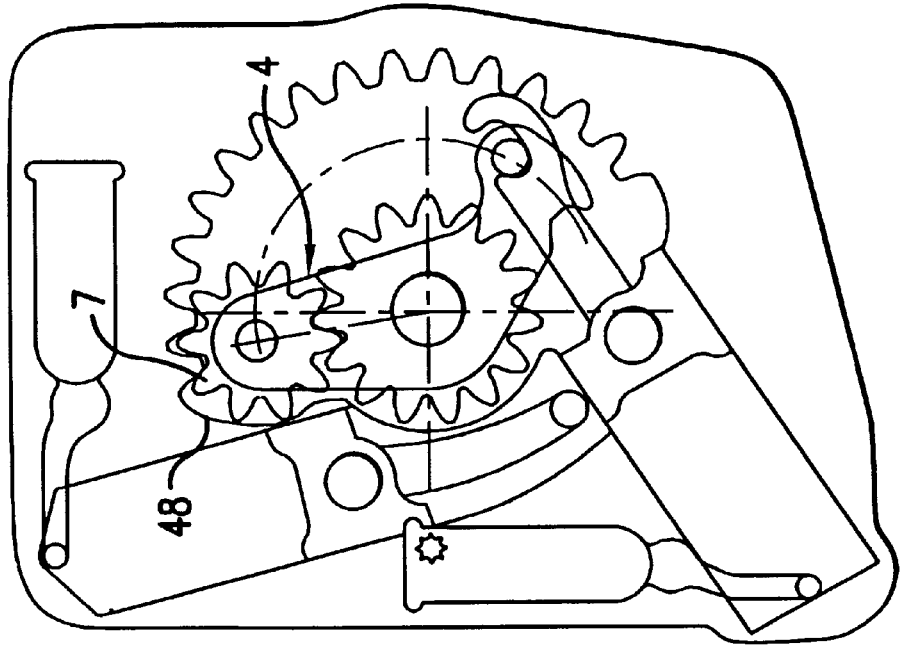
FIG. 6 is a top view according to FIG. 1 of the belt tightening device in an end position.

A stop (not shown) limits the forward movement of the piston 12 in the position illustrated in FIG. 3. In a defined position before this position is reached, a mechanical ignition of the propellent charge 37 of the secondary gas generator 36 takes place by means of an ignition edge 45 of the piston 12 which impacts on a striking pin 46 of the secondary gas generator 38. The forming propellant gas flows by way of the flow duct 35 into the expansion chamber 34 and drives the piston 30 with the connecting rod 31 forward in an accelerated manner so that the connecting rod 31 moves faster relative to the pin 43 and so that the pin 43 is displaced in the recess 42 toward the rear relative to the connecting rod 31 and is placed against a rear stop face 47 for a further force transmission (see FIG. 4). The propellant gas, which continues to flow into the expansion space 34 moves the piston connecting rod unit 30, 31 by way of the position illustrated in FIG. 5 ( which shows a rotation of the crank disk 4 about an angle of 112.5°) into the end position illustrated in FIG. 6 in which the rotation of the crank disk 4 is limited by a stop or by placing the planet gear 7 on an end wall 48. In this end position, the crank disk 4 has been rotated with respect to the initial position by 150°. In the case of a transmission ratio or ratio i of the tooth number of the planet gear 7 to the sun gear 2 of i=0.3, the superimposed swivelling and rotating movement of the travelling planet gear 7 results in an angle of rotation of the sun gear 2 of 487° and therefore achieves the rotating movement of the winding shaft required for the tightening of the belt without any intermediate transmission.

Figure 7:
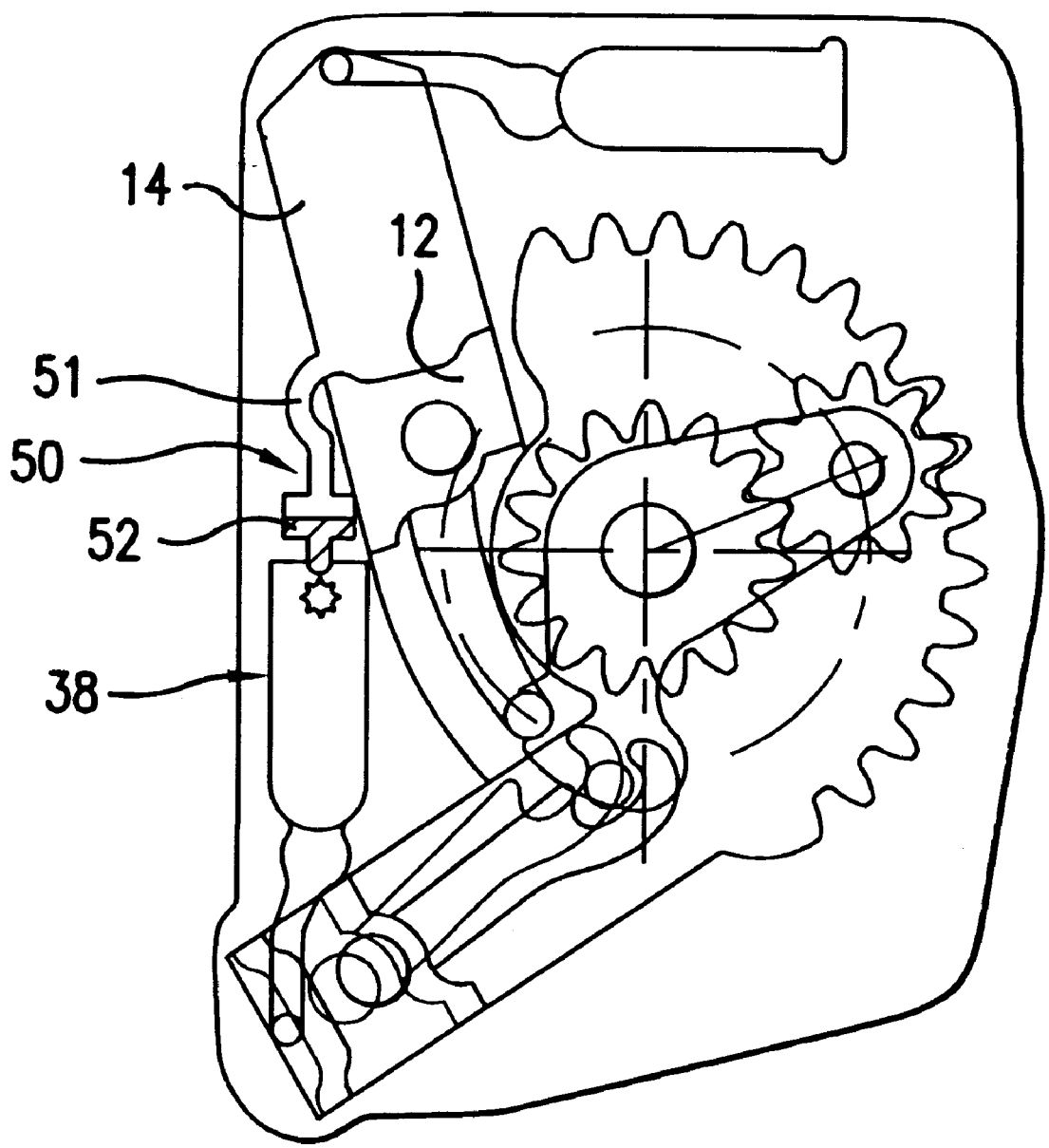
FIG. 7 is a top view according to FIG. 3 of another embodiment of the belt tightening device.

In the embodiment illustrated in FIG. 7, the ignition of the propellent charge of the secondary gas generator 38 takes place by way of a gas pressure ignition device 50 which has a pressure pipe 51 branching off the longitudinal guide 14 and an ignition piston 52 arranged at the end of the pressure pipe 51 for igniting the propellent charge of the secondary gas generator 38. The pressure pipe 52 branches off the guide 14 in such a position that the piston 12 opens up the pressure pipe at a defined point in time which is optimal for the continuous sequence of movements.

Figure 8:
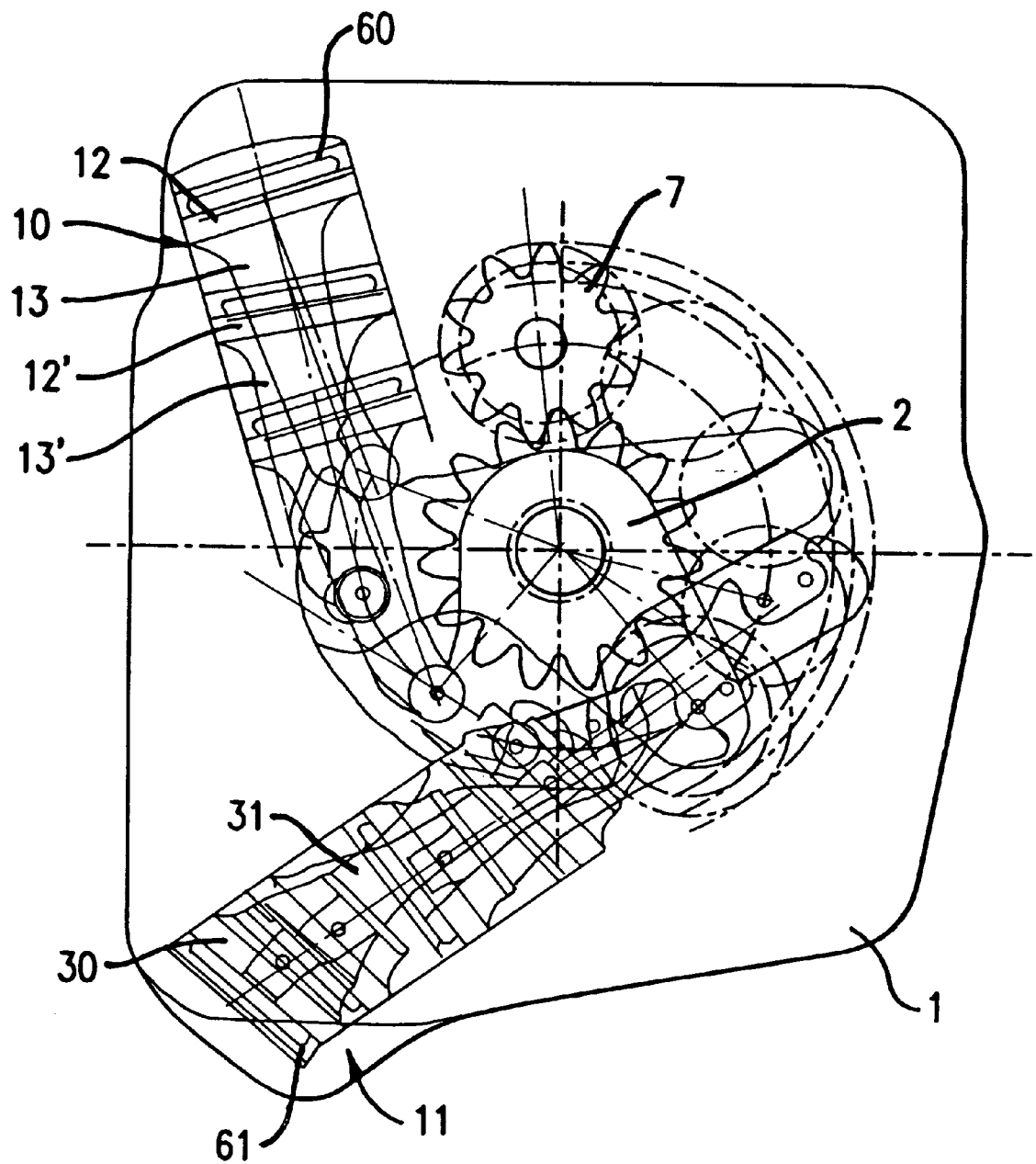
FIG. 8 is a top view of the representation of superimposed movement sequence phases of another embodiment.

The embodiment illustrated in FIG. 8, whose moved parts are illustrated in several moving sequence positions illustrated above one another, is essentially constructed according to the above-described belt tightening device but differs with respect to the type of the two piston connecting rod units 12, 13 and 30, 31 which in this case contain a rigid one-piece arrangement of the connecting rod 13 and 31 on the respective piston 12 and 30. The piston has a conical construction in the longitudinal direction so that it can go along in the swivelling or pendulum motion of the piston connecting rod unit which is clearly visible, for example, in the position marked 12' and 13'. The gas generators are not shown in FIG. 8.

The sealing of each piston 12, 30 with respect to the respective guide 14 and 32 can take place by way of a separate sealing element on the piston (see, for example, sealing elements 60 and 61 in FIG. 8) or by the piston itself which in this case is constructed such that it expands slightly to the required extent as the result of the pressure of the propelling gas.

Figure 5:
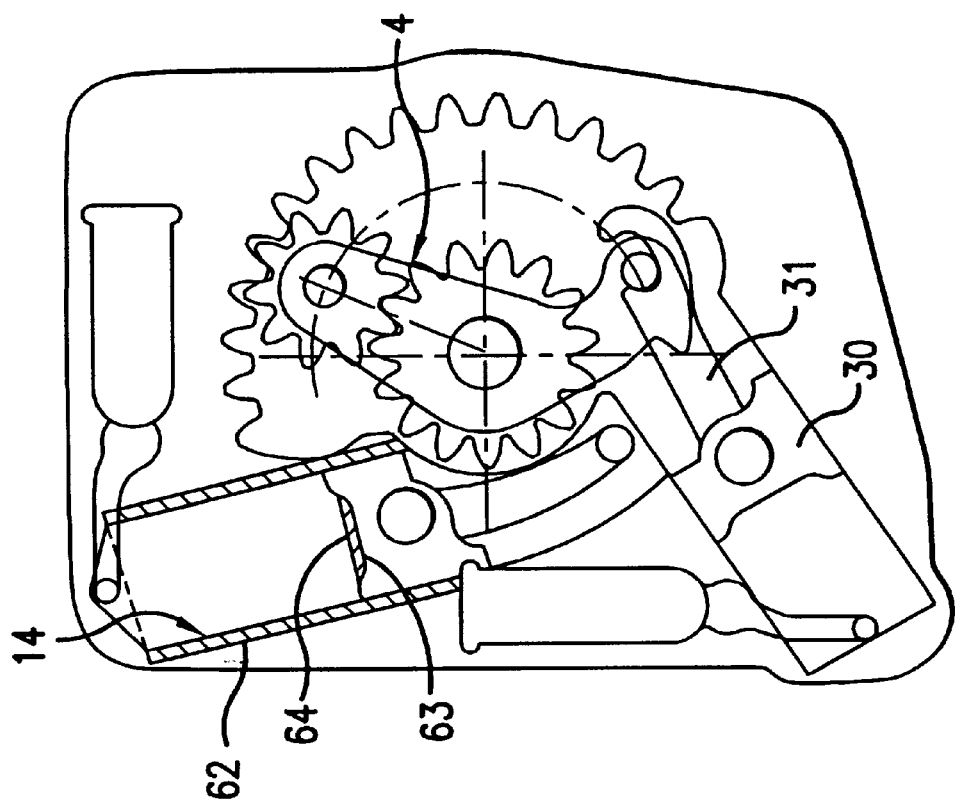
FIG. 5 is a top view according to FIG. 1 of the belt tightening device in a fourth movement phase.

The longitudinal guides 14, 32 for the pistons 12, 30 may be formed by guiding tubes which are inserted in recesses in the housing 1 or in the two housing halves provided for this purpose and, because of their closed cross-section, provide an improved sealing on the junction plane of the housing. In FIG. 5, a guiding tube 62 of this type is illustrated schematically as an example. The gas generators may be integrated on the guiding tubes in order to optimize the gas pressure sealing.

Instead of being constructed as an integral component of the housing 1, the internal toothing 9 may also be constructed as a part which is inserted into the housing 1 and which may consist of a material of a stability which is higher than that of the material of the housing and can be more easily manufactured as a separate part.

On the piston bottom 63 of one or both pistons 12 or 30, an additional propellent charge 64 can be mounted (see the example illustrated in FIG. 5) which is ignited by the propellent charge of the respective gas generator and can therefore provide an additional piston driving force which makes it possible to implement special courses of the driving force. Particularly in the case of the one-piece construction of the piston and the connecting rod illustrated in FIG. 8, an additional propellent charge can be provided in a central hollow space in the piston and optionally also in the connecting rod.

Instead of being carried out by the piston 12 of the primary drive unit 10, the ignition of the secondary gas generator 38 can also be carried out by a striking projection (not shown) on the crank disk 4 which striking projection acts upon a striking pin of the secondary gas generator at a defined point in time of the moving sequence.

The internal toothing 9 may be limited to an angular range which is smaller than in the representations in the figures so that, in its initial position illustrated in FIG. 1, the planet gear 7 does not engage in the internal toothing 9 and can therefore be freely rotated by the sun gear 2 so that a direct coupling of the sun gear 2 to the winding shaft of the seat belt retractor without an intermediate connection of a clutch is possible for permitting a belt movement before the triggering of the belt tightening device. The same applies to the end position of the planet gear 7 illustrated in FIG. 6 in which a smooth wall area without an internal toothing 9 can ensure the free rotatability of the planet gear 7 and thus of the sun gear 2 and of the belt.

The arrangement of the longitudinal guides and of the gas generators in the housing and in their mutual positioning may be varied to a certain extent as long as the illustrated compact design of the belt tightening device is maintained.

I claim:

1. Belt tightening device for a seat belt having at least first and second pyrotechnically drivable drive units which are moved in guides in a housing and which, in a chronologically adapted succession, are brought into a driving engagement with a winding shaft of a seat belt retractor and cause this shaft to carry out a rotating movement which tightens the belt, characterized by a sun gear which is rotationally coupled with the winding shaft for transmitting the tightening movement, and a planet gear which is guided on a circular-segment-shaped moving path around the sun gear, this planet gear moving along a housing-fixed toothing and simultaneously being in a rotation-transmitting engagement with an external toothing of the sun gear, and each drive unit for transmitting its driving movement onto the planet gear being coupled with this planet gear for a defined movement section of the planet gear.

2. Belt tightening device according to claim 1, characterized in that, concentrically with respect to the axis of the sun gear, a crank or crank disk is disposed in a rotatable manner on which the planet gear is rotatably disposed and which, for transmitting the movement has at least one engagement point for the engagement of the drive units.

3. Belt tightening device according to claim 2, characterized in that each drive unit has a gas generator with a pyrotechnic propellent charge and a piston connecting rod unit which is moved in a guide as the result of the gas pressure.

4. Belt tightening device according to claim 3, characterized in that each respective connecting rod and piston form a rigid unit.

5. Belt tightening device according to claim 4, characterized in that each piston has a conically beveled circumferential surface.

6. Belt tightening device according to claim 3, characterized in that each respective connecting rod is swivellably disposed on its piston.

7. Belt tightening device according to claim 3, characterized in that the connecting rods of the first and second drive units have engagement parts for the engagement with a primary and secondary engagement point of the crank disk.

8. Belt tightening device according to claim 3, characterized in that the pistons are guided in guiding tubes received in the housing.

9. Belt tightening device according to claim 8, characterized in that the gas generators are integrated on the respective guiding tubes.

10. Belt tightening device according to claim 9, characterized in that the gas generator of the first drive unit is ignited by an electric or a mechanical igniter.

11. Belt tightening device according to claim 10, characterized in that the gas generator of the second drive unit is ignited by a mechanical igniter.

12. Belt tightening device according to claim 11, characterized in that the igniter for the gas generator of the second drive unit is triggered by the piston of the first drive unit or the crank disk when a defined position is reached.

13. Belt tightening device according to claim 11, characterized in that the gas generator of the second drive unit is ignited by the gas pressure of the propellent charge of the first drive unit.

14. Belt tightening device according to claim 13, characterized in that the gas pressure of the propellent charge of the first drive unit ignites the igniter of the gas generator of the second drive unit by way of a pressure pipe which is opened up by the piston of the first drive unit.

15. Belt tightening device according to claim 3, characterized in that a sealing element is mounted on each piston.

16. Belt tightening device according to claim 15, characterized in that an additional propellent charge is provided on each piston.

17. Belt tightening device according to claim 1, characterized in that the planet gear is disengaged from the toothing in its initial and in its end position.

* * * * *